(12) United States Patent
Bressanelli et al.

(10) Patent No.: US 12,101,836 B2
(45) Date of Patent: Sep. 24, 2024

(54) NETWORK SOLUTION FOR HANDLING MISSED UPLINK GRANTS

(71) Applicant: QUALCOMM Incorporated, San Diego, CA (US)

(72) Inventors: Dominique Francois Bressanelli, Eschborn (DE); Ashish Raj Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 17/587,917

(22) Filed: Jan. 28, 2022

(65) Prior Publication Data

US 2023/0300929 A1 Sep. 21, 2023

(51) Int. Cl.
*H04W 76/18* (2018.01)
*H04L 1/18* (2023.01)
(Continued)

(52) U.S. Cl.
CPC .......... *H04W 76/18* (2018.02); *H04L 1/1812* (2013.01); *H04L 5/0053* (2013.01); *H04W 72/21* (2023.01); *H04W 72/23* (2023.01)

(58) Field of Classification Search
CPC ... H04L 1/1812; H04L 1/1829; H04L 1/1867; H04L 5/0053; H04W 72/1284; H04W 72/14; H04W 72/232; H04W 76/18
See application file for complete search history.

(56) References Cited

U.S. PATENT DOCUMENTS 8,929,475 B2 *  1/2015  Akkarakaran ....... H04B 7/0613
                                                         375/267
9,363,688 B2 *  6/2016  Lu ......................... H04W 24/02
(Continued)

FOREIGN PATENT DOCUMENTS

EP       2811775 A1    12/2014

OTHER PUBLICATIONS

Huawei., et al., "Handling on TBS Mismatch for AUL", 3GPP TSG-RAN2 Meeting #101 bis, R2-1808456, 3rd Generation Partnership Project, Mobile Competence Centre, 650, Route Des Lucioles, F-06921 Sophia-Antipolis Cedex, France, vol. RAN WG2, No. Busan, Korea, May 21, 2018-May 25, 2018, May 20, 2018, XP051444729, Section 2 "Discussion", pp. 1-2, figure 1.
(Continued)

*Primary Examiner* — Alpus Hsu
(74) *Attorney, Agent, or Firm* — QUALCOMM IP DEPT.; James Hunt Yancey, Jr.

(57) ABSTRACT

Methods, systems, and devices for wireless communications are described. A base station may transmit a first transport block including a first uplink grant which schedules a first set of uplink shared channel transmissions for the UE. The base station may monitor the channel to detect an energy value for a demodulation reference signal (DMRS) associated with the one or more uplink shared channel transmissions associated with the first uplink grant that is less than a threshold energy value. Based on the relatively low DMRS energy, the base station may modify a size of a second transport block relative to the first transport block, the second transport block including a second uplink grant that schedules a second set of one or more uplink shared channel transmissions for the UE. The base station may then signal the grant for the modified second transport block to the UE or to another device.

30 Claims, 9 Drawing Sheets

(51) Int. Cl.
    *H04L 1/1812*    (2023.01)
    *H04L 5/00*    (2006.01)
    *H04W 72/12*    (2023.01)
    *H04W 72/14*    (2009.01)
    *H04W 72/21*    (2023.01)
    *H04W 72/23*    (2023.01)

(56) References Cited

U.S. PATENT DOCUMENTS

| | | | |
|---|---|---|---|
| 9,853,753 B2* | 12/2017 | Lu | H04W 72/23 |
| 2013/0039292 A1 | 2/2013 | Liu et al. | |
| 2021/0014874 A1* | 1/2021 | Deogun | H04W 72/23 |
| 2021/0067950 A1* | 3/2021 | Hosseini | H04L 5/0044 |
| 2021/0289540 A1* | 9/2021 | Khoshnevisan | H04L 1/189 |
| 2022/0007412 A1* | 1/2022 | Rico Alvarino | H04L 1/1887 |
| 2022/0021502 A1* | 1/2022 | Horn | H04L 5/0051 |
| 2022/0224449 A1* | 7/2022 | Shrestha | H04W 76/27 |
| 2022/0287039 A1* | 9/2022 | Sridharan | H04W 72/53 |

OTHER PUBLICATIONS

International Search Report and Written Opinion—PCT/US2022/054321—ISA/EPO—May 4, 2023 (2104872WO).

* cited by examiner

NETWORK SOLUTION FOR HANDLING MISSED UPLINK GRANTS

FIELD OF TECHNOLOGY

The following relates to wireless communications, including network solution for handling missed uplink grants.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may schedule uplink communications for a UE using one or more uplink grants. In some cases, however, channel interference and scheduling inefficiencies may reduce throughput for the granted uplink communications.

SUMMARY

The described techniques relate to improved methods, systems, devices, and apparatuses that support network solution for handling missed uplink grants. Generally, the described techniques provide support for scheduling granted uplink communications between a base station and a user equipment (UE). For example, a base station may transmit multiple uplink grants to a UE, and the UE may use the uplink grants to transmit uplink communications to the base station. In some cases, however, the UE may fail to receive or decode at least one of the uplink grants transmitted from the base station due to poor channel quality, interference, or a number of other system factors. In such cases that the UE fails to receive one uplink grant, the next uplink grant that the UE receives may be indistinguishable from a prior uplink grant received before the missed uplink grant. In such cases, the UE may incorrectly determine that the uplink grant received after the missed uplink grant is a retransmission of the prior uplink grant. The UE may then perform a retransmission of communications associated with the previous grant rather than performing a new uplink transmission, thus reducing scheduling efficiency and uplink throughput, and also increasing latency.

In some examples, the base station may implement a number of different techniques to increase the likelihood that the UE distinguishes the different uplink grants. For example, the base station may identify a missed uplink grant by detecting floored (or lower than expected) demodulation reference signal (DMRS) energy for an uplink shared channel transmission that was scheduled by the missed uplink grant. In response, the base station may change (e.g., increase or decrease) the transport block size of the next uplink grant (e.g., the uplink grant transmitted after detection of the floored DMRS energy) such that the next uplink grant has a different transport block size from the last grant that was received by the UE before the missed uplink grant. In some examples, the base station may change a modulation and coding scheme (MCS) or the number of resource blocks (RBs) of the next uplink grant in order to change the transport block size.

A method for wireless communications at a base station is described. The method may include transmitting, to a user equipment (UE), a first transport block including a first uplink grant scheduling a first set of one or more uplink shared channel transmissions for the UE, detecting an energy value for a DMRS associated with the one or more uplink shared channel transmissions associated with the first uplink grant that is less than a threshold energy value, modifying the size of a second transport block relative to the first transport block, the second transport block including a second uplink grant scheduling a second set of one or more uplink shared channel transmissions for the UE based on the detected energy value being less than the threshold energy value, and transmitting, to the UE, a second transport block.

An apparatus for wireless communications at a base station is described. The apparatus may include a processor, memory coupled with the processor, and instructions stored in the memory. The instructions may be executable by the processor to cause the apparatus to transmit, to a UE, a first transport block including a first uplink grant scheduling a first set of one or more uplink shared channel transmissions for the UE, detect an energy value for a DMRS associated with the one or more uplink shared channel transmissions associated with the first uplink grant that is less than a threshold energy value, modify the size of a second transport block relative to the first transport block, the second transport block including a second uplink grant scheduling a second set of one or more uplink shared channel transmissions for the UE based on the detected energy value being less than the threshold energy value, and transmit, to the UE, a second transport block.

Another apparatus for wireless communications at a base station is described. The apparatus may include means for transmitting, to a UE, a first transport block including a first uplink grant scheduling a first set of one or more uplink shared channel transmissions for the UE, means for detecting an energy value for a DMRS associated with the one or more uplink shared channel transmissions associated with the first uplink grant that is less than a threshold energy value, means for modifying the size of a second transport block relative to the first transport block, the second transport block including a second uplink grant scheduling a second set of one or more uplink shared channel transmissions for the UE based on the detected energy value being less than the threshold energy value, and means for transmitting, to the UE, a second transport block.

A non-transitory computer-readable medium storing code for wireless communications at a base station is described. The code may include instructions executable by a processor to transmit, to a UE, a first transport block including a first uplink grant scheduling a first set of one or more uplink shared channel transmissions for the UE, detect an energy value for a DMRS associated with the one or more uplink shared channel transmissions associated with the first uplink grant that is less than a threshold energy value, modify the size of a second transport block relative to the first transport block, the second transport block including a second uplink grant scheduling a second set of one or more uplink shared channel transmissions for the UE based on the detected energy value being less than the threshold energy value, and transmit, to the UE, a second transport block.

In some examples of the method, apparatuses, and non-transitory computer-readable medium described herein, the modifying may include operations, features, means, or instructions for modifying a modulation and coding scheme (MCS) of the second transport block, a number of resource blocks of the second transport block, or both, based on the detected energy value being less than the threshold energy value.

In some examples of the method, apparatuses, and non-transitory computer-readable medium described herein, the modifying may include operations, features, means, or instructions for increasing or decreasing the size of the second transport block relative to the first transport block.

In some examples of the method, apparatuses, and non-transitory computer-readable medium described herein, the threshold energy value further includes a SNR threshold value.

In some examples of the method, apparatuses, and non-transitory computer-readable medium described herein, detecting the energy value may include operations, features, means, or instructions for determining that the UE skipped transmission of the first set of one or more uplink shared channel transmissions scheduled by the first uplink grant based on the detected energy value being less than the threshold energy value.

Some examples of the method, apparatuses, and non-transitory computer-readable medium described herein may further include operations, features, means, or instructions for receiving, from the UE, the second set of one or more uplink shared channel transmissions in accordance with the second uplink grant.

In some examples of the method, apparatuses, and non-transitory computer-readable medium described herein, the second set of one or more uplink shared channel transmissions may be different from the first set of one or more uplink shared channel transmissions.

In some examples of the method, apparatuses, and non-transitory computer-readable medium described herein, the first uplink grant decoded by the UE may be associated with a first new data indicator (NDI) and the second uplink grant decoded by the UE may be associated with a second NDI, the second NDI being the same as the first NDI.

In some examples of the method, apparatuses, and non-transitory computer-readable medium described herein, the first uplink grant decoded by the UE may be associated with a first hybrid automatic repeat request (HARQ) identifier and the second uplink grant decoded by the UE may be associated with a second HARQ identifier, the second HARQ identifier being the same as the first HARQ identifier.

In some examples of the method, apparatuses, and non-transitory computer-readable medium described herein, detecting the energy value may include operations, features, means, or instructions for detecting an energy value for each DMRS associated with each uplink shared channel transmission of the one or more uplink shared channel transmissions associated with the first uplink grant, where the energy value for each DMRS may be less than the threshold energy value.

DETAILED DESCRIPTION

Figure 1:
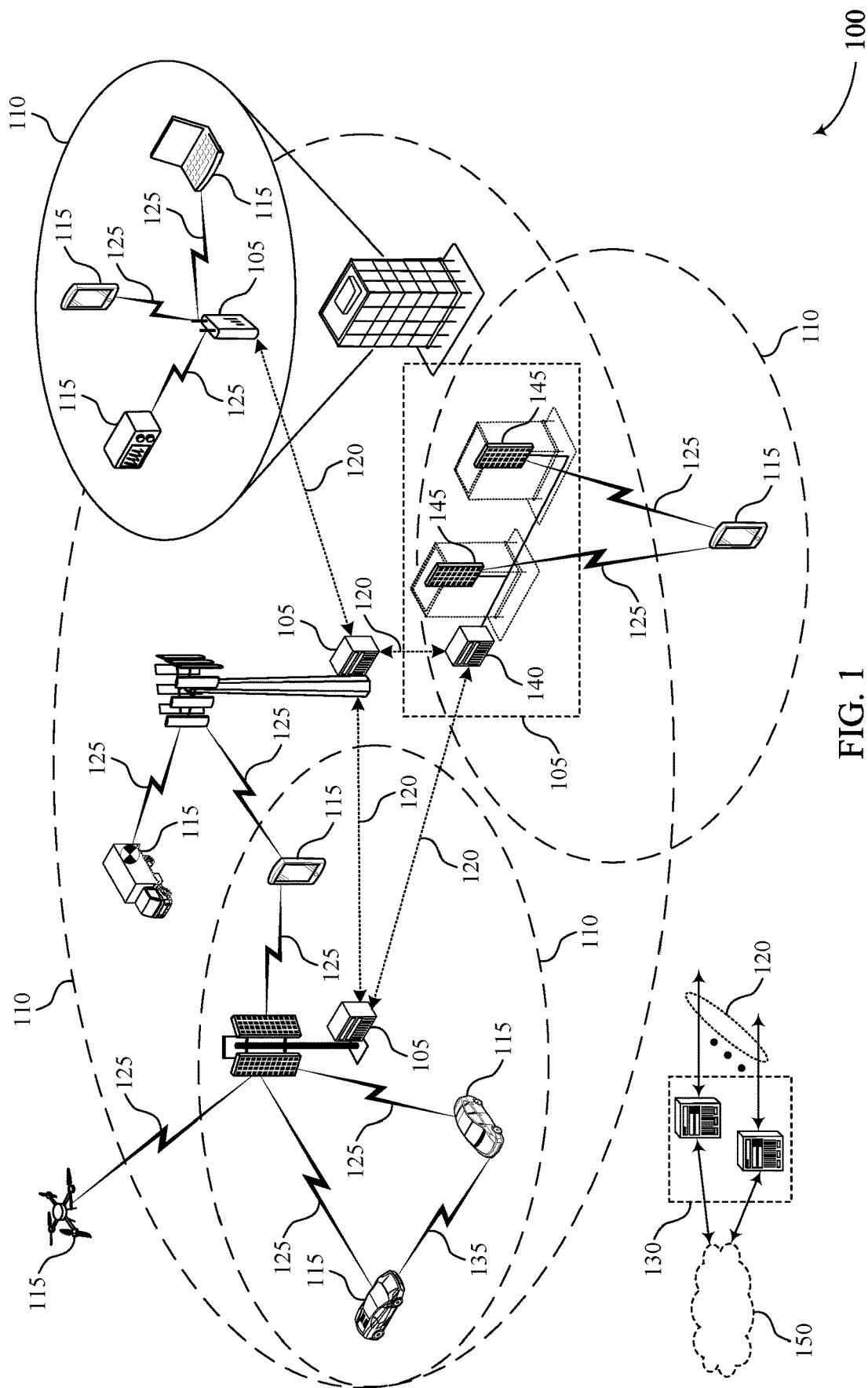
FIG. 1 illustrates an example of a wireless communications system that supports network solution for handling missed uplink grants in accordance with aspects of the present disclosure.

Some wireless communications systems may support high frequency signaling between a base station and a user equipment (UE) using scheduled uplink communications. In some examples, the base station may transmit multiple uplink grants to the UE, and the UE may use the uplink grants to transmit scheduled uplink communications to the base station. In some cases, however, due to poor channel conditions, channel interference, or other system factors, the UE may fail to receive and decode at least one of the uplink grants transmitted from the base station. Additionally or alternatively, the base station may transmit the uplink grant while the UE is in a low power or sleep state, causing the UE to miss receiving the uplink grant.

Failure to receive an uplink grant may result in a number of inefficiencies for the base station and the UE. For example, in at least some cases, when the UE fails to receive one uplink grant and then receives a next uplink grant, the next uplink grant may be indistinguishable from a prior uplink grant received before the missed uplink grant. Then, the UE may incorrectly determine that the uplink grant received after the missed uplink grant is a retransmission of the prior uplink grant (e.g., based on a same new data indicator (NDI) and transport block size associated with the received uplink grants), and the UE may perform a retransmission of the uplink data associated with the prior uplink data instead of performing a transmission of uplink data associated with the next uplink grant. Accordingly, the missed uplink grant may reduce uplink throughput, increase UE latency and may cause the UE to perform unnecessary retransmissions.

To more effectively identify and mitigate the reduced uplink performance and throughput that may occur due to missed uplink grants, in some examples, the base station may implement a number of different techniques to increase the likelihood that the UE distinguishes the different uplink grants. For example, upon detecting floored (or lower than expected) demodulation reference signal (DMRS) energy for an uplink shared channel transmission scheduled by the missed uplink grant, the base station may determine that the UE failed to decode the missed uplink grant and further failed to transmit the scheduled uplink communications. In response, the base station may change (e.g., increase or decrease) the transport block size of the next uplink grant (e.g., the uplink grant transmitted after detection of the floored DMRS energy) such that the next uplink grant has a different transport block size from the last grant that was received by the UE before the missed uplink grant. In some examples, the base station may change a modulation and coding scheme (MCS) or the number of resource blocks (RBs) or the next uplink grant in order to change the transport block size.

The UE may then receive the next uplink grant and may identify that it has a different transport block size from the last received uplink grant, and may determine that the next uplink grant is different from the last received uplink grant. Accordingly, the UE may flush its hybrid automatic repeat request (HARQ) buffer and may begin a new uplink transmission according to the latest received uplink grant. In such cases, distinguishing between the received uplink grants as different uplink grants may increase uplink throughput and performance for the UE because the UE may transmit new uplink channel transmissions rather than re-transmitting uplink communications that were already received by the base station.

Aspects of the disclosure are initially described in the context of wireless communications systems. Aspects of the disclosure are further illustrated by and described with reference to apparatus diagrams, system diagrams, a decision flow, a process flow, and flowcharts that relate to network solution for handling missed uplink grants.

FIG. 1 illustrates an example of a wireless communications system 100 that supports network solution for handling missed uplink grants in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

As described herein, a base station 105 may include one or more components that are located at a single physical location or one or more components located at various physical locations. In examples in which the base station 105 includes components that are located at various physical locations, the various components may each perform various functions such that, collectively, the various components achieve functionality that is similar to a base station 105 that is located at a single physical location. As such, a base station 105 described herein may equivalently refer to a standalone base station 105 (also known as a monolithic base station) or a base station 105 including components that are located at various physical locations or virtualized locations (also known as a disaggregated BS). In some implementations, such a base station 105 including components that are located at various physical locations may be referred to as or may be associated with a disaggregated radio access network (RAN) architecture, such as an Open RAN (O-RAN) or Virtualized RAN (VRAN) architecture. In some implementations, such components of a base station 105 may include or refer to one or more of a central unit (or centralized unit CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations, a base station 105 may transmit multiple uplink grants to a UE 115, and the UE 115 may use the uplink grants to transmit scheduled uplink communications to the base station 105. In some cases, however, the UE 115 may fail to receive or decode at least one of the uplink grants transmitted from the base station 105 due to various poor channel quality or interference, or because the base station 105 transmitted the grant while the UE 115 was in a low power or sleep state.

In some cases, when the UE 115 fails to receive one uplink grant and then receives a next uplink grant, the next uplink grant may be indistinguishable from a prior uplink grant received before the missed uplink grant. Then, the UE 115 may incorrectly determine that the uplink grant received after the missed uplink grant is a retransmission of the prior uplink grant (e.g., based on a same new data indicator (NDI) and transport block size associated with the received uplink grants), and the UE 115 may perform a retransmission of the uplink data associated with the prior uplink data instead of performing a transmission of uplink data associated with the next uplink grant. Accordingly, the missed uplink grant may reduce uplink throughput and may cause the UE 115 to perform unnecessary retransmissions.

To more effectively identify and mitigate the reduced uplink performance and throughput that may occur due to missed uplink grants, in some examples, the base station 105 may implement a number of different techniques to increase the likelihood that the UE 115 distinguishes the different uplink grants. For example, the base station 105 may identify a missed uplink grant by detecting floored (or lower than expected) demodulation reference signal (DMRS) energy for an uplink shared channel transmission that was to be scheduled by the missed uplink grant. In response, the base station 105 may change (e.g., increase or decrease) the transport block size of the next uplink grant (e.g., the uplink grant transmitted after detection of the floored DMRS energy) such that the next uplink grant has a different transport block size from the last grant that was received by the UE 115 before the missed uplink grant. In some examples, the base station may change a modulation and coding scheme (MCS) or the number of RBs or the next uplink grant in order to change the transport block size.

Figure 2:
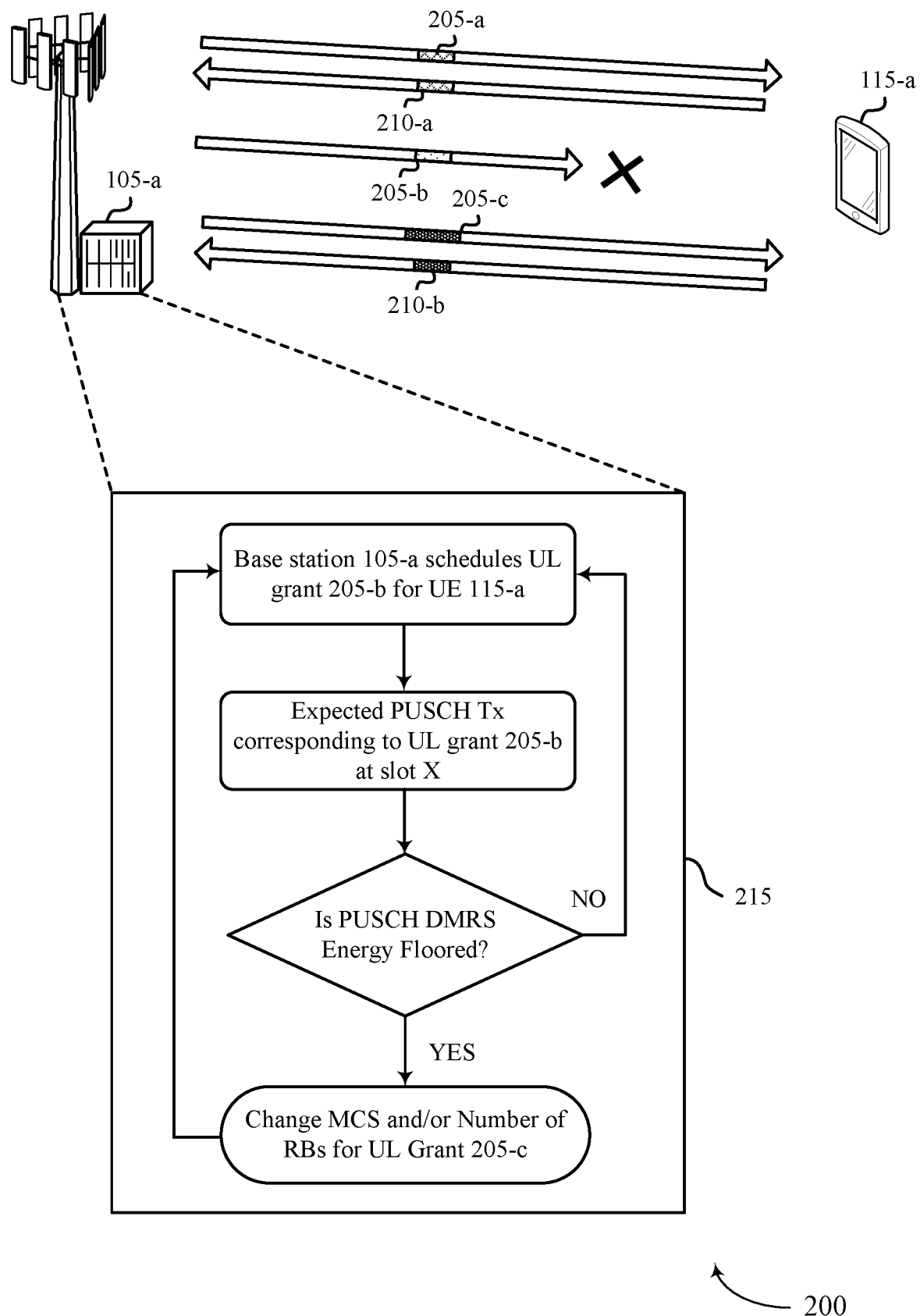
FIG. 2 illustrates an example of a wireless communications system and decision flow that supports network solution for handling missed uplink grants in accordance with aspects of the present disclosure.

FIG. 2 illustrates an example of a wireless communications system and decision flow 200 that supports network solution for handling missed uplink grants in accordance with aspects of the present disclosure. For example, wireless communications system and decision flow 200 may support communications between a base station 105-a and a UE 115-a, each of which may be examples of corresponding devices described with reference to FIG. 1.

Wireless communications system and decision flow 200 may support high frequency communications between the base station 105-a and a UE 115-a. In some implementations, for example, wireless communications system 200 may be an example of a 5G/NR system configured for both standalone and non-standalone operations in sub-6 GHz frequency bands (e.g., frequency range 1 (FR1)) and in frequency bands higher than 24 GHz (e.g., frequency range 2 (FR2). To support such high frequency communications between the base station 105-a and the UE 115-a (and between other devices in the wireless communications network 200), the base station 105-a may transmit one or more uplink grants 205 to schedule the UE 115-a to transmit uplink data to the base station 105-a during a scheduled time duration indicated by the one or more uplink grants 205.

In some examples, the base station 105-a may transmit multiple uplink grants 205 and the UE 115-a may receive the uplink grants 205 and transmit corresponding uplink communications to the base station 105-a using the uplink grants 205. In some cases, however, due to poor channel conditions, mid-cell or edge-cell conditions, interference, or other system factors, the UE 115-a may fail to receive at least one of the uplink grants 205 transmitted from the base station 105-a (e.g., uplink grant 205-b). Additionally or alternatively, the base station 105-a may transmit the uplink grant 205-b after falsely detecting an uplink scheduling request from the UE 115-a. Then based on the false detection, the base station 105-a may transmit the uplink grant 205-b while the UE 115-a is in a sleep state or a low power mode corresponding to an off duration of a connected mode discontinuous reception (CDRX) mode for the UE 115-a. In such cases, the UE 115-a may be unable to decode the uplink grant 205-b, and the next uplink grant that the UE 115-a receives will be uplink grant 205-c. In at least some examples, because the UE 115-a missed the reception of the uplink grant 205-b, the UE 115-a may incorrectly determine that the uplink grant 205-c is a retransmission of the uplink grant 205-a (e.g., based on a same NDI associated with the uplink grants 205-a and 205-c), and the UE 115-a may perform a retransmission of the first PUSCH 210-a associated with the first uplink grant 205-a instead of performing a transmission of third uplink data associated with the third uplink grant 205-c. In such cases, the missed second uplink grant 205-b may reduce uplink throughput and may cause the UE 115-a to perform unnecessary retransmissions.

In an example of the processes described herein, the base station 105-a may schedule the UE 115-a with the following uplink grants (e.g., uplink grants 205-a, 205-b, and 205-c):

| SFN/ Slot | Grant Decoded by UE 115-a | HARQ ID | NDI | MCS | Number of RB | TBS | PUSCH detected by base station 105-a |
|---|---|---|---|---|---|---|---|
| 100/01 | Yes (205-a) | 1 | 1 | 19 | 64 | 2304 | Yes (210-a) |
| 100/11 | No (205-b) | 1 | 0 | 19 | 64 | 2304 | No |
| 100/21 | Yes (205-c) | 1 | 1 | 19 | 64 | 2304 | Yes (210-b) |

The uplink grant 205-a may be decoded at a slot and slot format number indicated by 100/01, and may be associated with a HARQ ID of 1, an NDI of 1, and a modulation and coding scheme (MCS) of 19. The first uplink grant 205-a may further include 64 RBs and a transport block size (TBS) of 2304. After receiving the uplink grant 205-a, the UE 115-a may transmit a PUSCH transmission to the base station 105-a, which the base station 105-a may detect. Based on the PUSCH detection, the base station 105-a may transmit an acknowledgment (HARQ-ACK) of the reception of the PUSCH by toggling the NDI for the second uplink grant 205-b.

The base station 105-a may transmit the second uplink grant 205-b with a toggled NDI (e.g., NDI 0) at a slot and SFN indicated by 100/11. The second uplink grant 205-b may be associated with a HARQ ID of 1, an MCS of 19, and may include 64 RBs with a TBS of 2304. Since the UE 115-a does not receive the uplink grant 205-b (e.g., based on poor channel conditions, interference, being in a sleep state, etc.) the UE 115-a may not perform a corresponding PUSCH transmission for this UL grant 205-b. Based on the missed uplink grant and missed PUSCH transmission, the base station 105-b may detect a "floored" PUSCH DMRS energy corresponding to this UL grant. For example, the PUSCH DMRS energy may be relatively lower than a PUSCH DMRS energy that the base station 105-a expects to receive from the UE 115-a, or the PUSCH DMRS with have a relatively lower signal to noise ratio (SNR) than expected by the base station 105-b for the scheduled PUSCH.

The base station 105-a may then transmit a third uplink grant 205-c at a slot and SFN indicated by 100/21. This third uplink grant 205-c is decoded by the UE 115-a and may include a HARQ ID of 1, an NDI of 1, an MCS of 19, with 64 RBs and a TBS of 2304. From the perspective of the UE 115-a, the third uplink grant 205-a is received after the first uplink grant 205-a (because the second uplink grant 205-c was missed by UE 115-a). Since the third uplink grant 205-c has the same HARQ ID and an NDI that is not toggled with respect to the first uplink grant 205-a, the UE 115-a may determine that the third grant 205-c is a retransmission of the first uplink grant 205-a, and that the base station 105-a is requesting retransmission of the PUSCH transmission 210-a rather than transmission of the PUSCH transmission 210-b. The UE 115-a may accordingly maintain the HARQ process associated with the first PUSCH 210-a, and may re-transmit the first PUSCH transmission 210-a. In some cases, this retransmission of the first PUSCH rather than transmission of a third PUSCH may reduce uplink throughput and scheduling efficiency, and may also increase latency.

To more effectively identify and mitigate the reduced uplink performance and throughput that may occur due to missed uplink grants, in some examples, the base station 105-b may implement a number of different techniques to increase the likelihood that the UE 115-a distinguishes the different uplink grants transmitted by the base station 105-a. For example, the base station 105-a may implement the decision flow 215 in order to determine steps for handling a missed uplink grant. For example, the base station 105-a may schedule uplink grants for the UE 115-a, and upon detecting floored (or lower than expected) DMRS energy for PUSCH attempts scheduled by at least one uplink grant (e.g., second uplink grant 205-b), the base station 105-a may determine that the second uplink grant 205-b was missed by the UE 115-a. In response, the base station 105-a may change (e.g., increase or decrease) the transport block size of the next uplink grant (e.g., third uplink grant 205-c or the uplink grant transmitted after detection of the floored DMRS energy) so that the next uplink grant has a different transport block size from a previous uplink grant (e.g., first uplink grant 205-a) received before the missed uplink grant. In some examples, the base station may change the MCS or the number of RBs in order to change the transport block size. Then, the base station 105-a may schedule the third uplink grant for the UE 115-a using the different transport block size.

The UE 115-a may receive the third uplink grant 205-c and may identify that it has a different TBS than the first uplink grant 205-a, and may determine that the third uplink grant 205-c is different from the first uplink grant 205-a, and may flush its HARQ buffer associated with the first PUSCH transmission associated with the first uplink grant 205-a, and may begin a new PUSCH transmission according to the third uplink grant 205-c. In such cases, the identification of the third uplink grant 205-c as a different uplink grant from the first uplink grant 205-a may increase uplink throughput and performance for the UE 115-a because the UE 115-a may transmit a new PUSCH transmission according to the third uplink grant 205-c (rather than transmitting a retransmission of the PUSCH transmission associated with the first uplink grant 205-a). Additionally or alternatively, the techniques described herein may increase the efficiency of resource utilization for the base station 105-a as the UE 115-a performs a new PUSCH transmission using the granted PUSCH resources rather than using the granted resources to transmit a retransmission.

Figure 3:
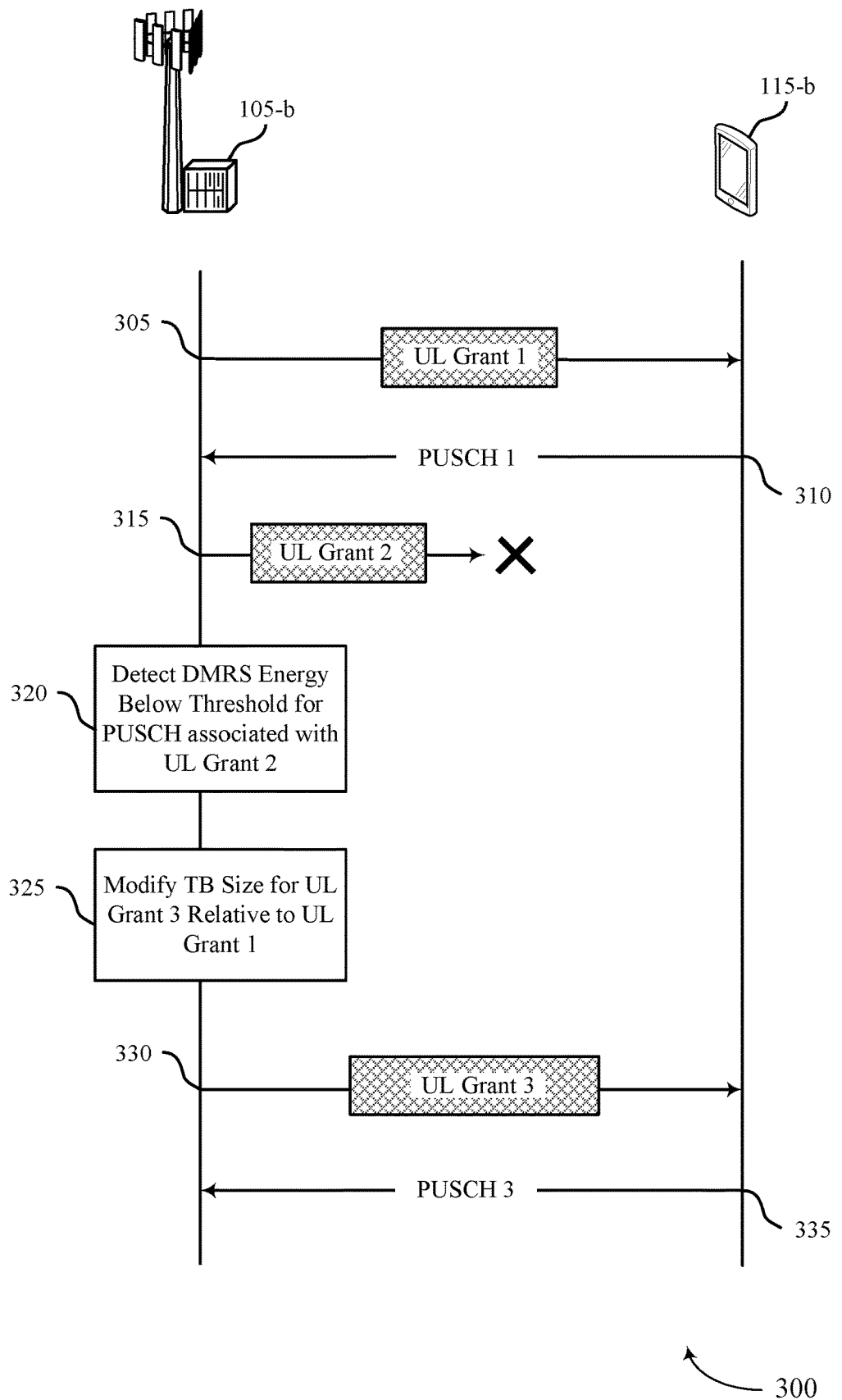
FIG. 3 illustrates an example of a process flow that supports network solution for handling missed uplink grants in accordance with aspects of the present disclosure.

FIG. 3 illustrates an example of a process flow 300 that supports network solution for handling missed uplink grants in accordance with aspects of the present disclosure. The process flow 300 may implement aspects of wireless communications systems 100 and 200, or may be implemented by aspects of the wireless communications systems 100 and 200. For example, the process flow 300 may illustrate operations between a UE 115-*b* and base station 105-*b*, which may be examples of corresponding devices described with reference to FIGS. 1 and 2. In the following description of the process flow 300, the operations between the devices may be transmitted in a different order than the example order shown, or the operations may be performed in different orders or at different times or by different devices. Additionally or alternatively, some operations may also be omitted from the process flow 300, and other operations may be added to the process flow 300.

At 305, the base station 105-*b* may transmit a first transport block, which includes a first uplink grant, and the UE 115-*b* may receive and decode the first uplink grant. The first uplink grant may schedule a first set of uplink shared channel transmissions (e.g., PUSCH) transmissions scheduled for the UE 115-*b*. In some examples, the UE 115-*b* may decode a DCI (e.g., DCI 0_1) to receive the uplink grant, and the DCI may further indicate NDI, HARQ ID, and MCS values associated with the first uplink grant, along with a number of RBs in the transport block. By way of an example with reference to process flow 300, the first uplink grant may be associated with an NDI with value x, a HARQ ID with value y, a MCS value of z, and a number of RBs equal to w.

At 310, the UE 115-*b* may transmit a first PUSCH of the first set of uplink shared channel (e.g., PUSCH) transmissions to the base station 105-*b* in accordance with the first uplink grant. The UE 115-*b* may transmit the PUSCH using a HARQ ID with value y, a MCS value of z, and a number of RBs equal to w.

At 315, the base station 105-*b* may transmit a second transport block which includes a second uplink grant. The first uplink grant may schedule a second set of uplink shared channel transmissions (e.g., PUSCH) transmissions scheduled for the UE 115-*b*. In some examples, the base station 105-*b* may transmit the second uplink grant with a DCI (e.g., DCI 0_1) which further indicates an NDI for the second uplink grant having a value of 1−x (e.g., toggled NDI), a HARQ ID with value y, a MCS value of z, and a number of RBs equal to w. In some examples, however, the UE 115-*b* may fail to receive the second uplink grant at 315 due to poor channel conditions or interference. Since the UE 115-*b* fails to decode the second uplink grant, the UE 115-*b* may not transmit the second set of uplink shared transmissions scheduled by the second uplink grant.

At 320, the base station may detect an energy value for a DMRS (e.g., DMRS SNR) associated with the second set of scheduled uplink shared channel transmissions associated with the second uplink grant that is less than a threshold energy value that the base station 105-*b* expects for uplink PUSCH transmissions from the UE 115-*b*. In such cases, the base station 105-*b* may determine that the UE 115-*b* missed reception of the second uplink grant, and did not transmit the second set of scheduled uplink shared channel transmissions.

At 325, in response to the missed uplink grant, the base station 105-*b* may modify (e.g., increase or decrease) a size of a third transport block relative to the first transport block, where the third transport block includes a third uplink grant scheduling a third set of uplink shared channel transmissions.

At 330, the base station 105-*b* may transmit the modified third transport block including the third uplink grant. In some examples, the UE 115-*b* may decode a DCI (e.g., DCI 0_1) to receive the third uplink grant, and the DCI may further indicate an NDI with value x, a HARQ ID with value y, a MCS value of z', and a number of RBs equal to w'. In such examples, the combination of changes to the MCS and the number of RBs may change the TB size relative to the TB used to transmit the first uplink grant.

At 335, the UE 115-*b* may transmit a PUSCH transmission to the base station 105-*b* in accordance with the third uplink grant using a HARQ ID with value y, a MCS value of z', and a number of RBs equal to w'.

Figure 4:
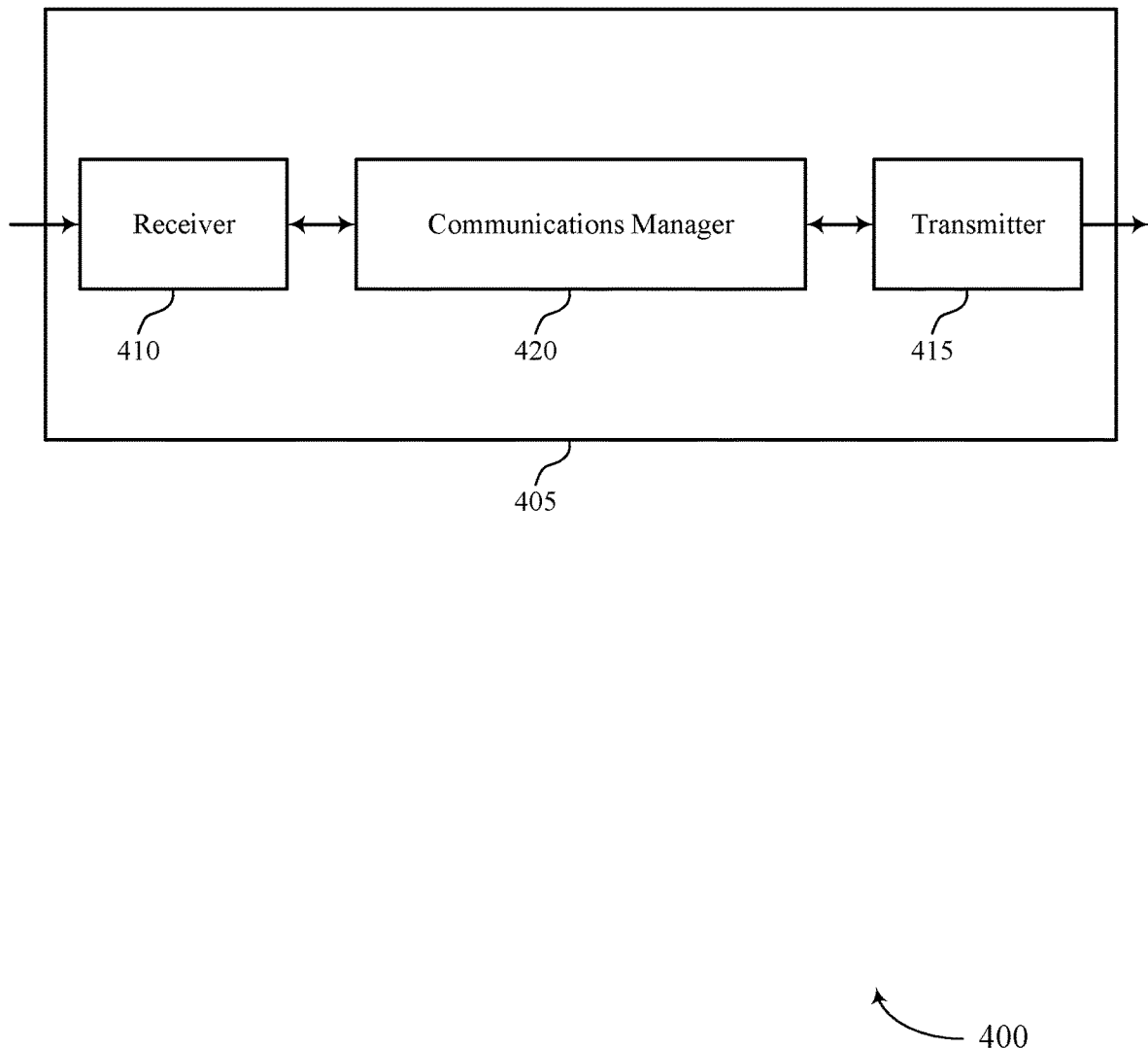
FIGS. 4 and 5 show block diagrams of devices that support network solution for handling missed uplink grants in accordance with aspects of the present disclosure.

FIG. 4 shows a block diagram 400 of a device 405 that supports network solution for handling missed uplink grants in accordance with aspects of the present disclosure. The device 405 may be an example of aspects of a base station 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to network solution for handling missed uplink grants). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to network solution for handling missed uplink grants). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of network solution for handling missed uplink grants as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a base station in accordance with examples as disclosed herein. For example, the communications manager 420 may be configured as or otherwise support a means for transmitting, to a UE, a first transport block including a first uplink grant scheduling a first set of one or more uplink shared channel transmissions for the UE. The communications manager 420 may be configured as or otherwise support a means for detecting an energy value for a demodulation reference signal associated with the one or more uplink shared channel transmissions associated with the first uplink grant that is less than a threshold energy value. The communications manager 420 may be configured as or otherwise support a means for modifying a size of a second transport block relative to the first transport block, the second transport block including a second uplink grant scheduling a second set of one or more uplink shared channel transmissions for the UE based on the detected energy value being less than the threshold energy value. The communications manager 420 may be configured as or otherwise support a means for transmitting the second transport block.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources including more efficient scheduling of uplink resources.

Figure 5:
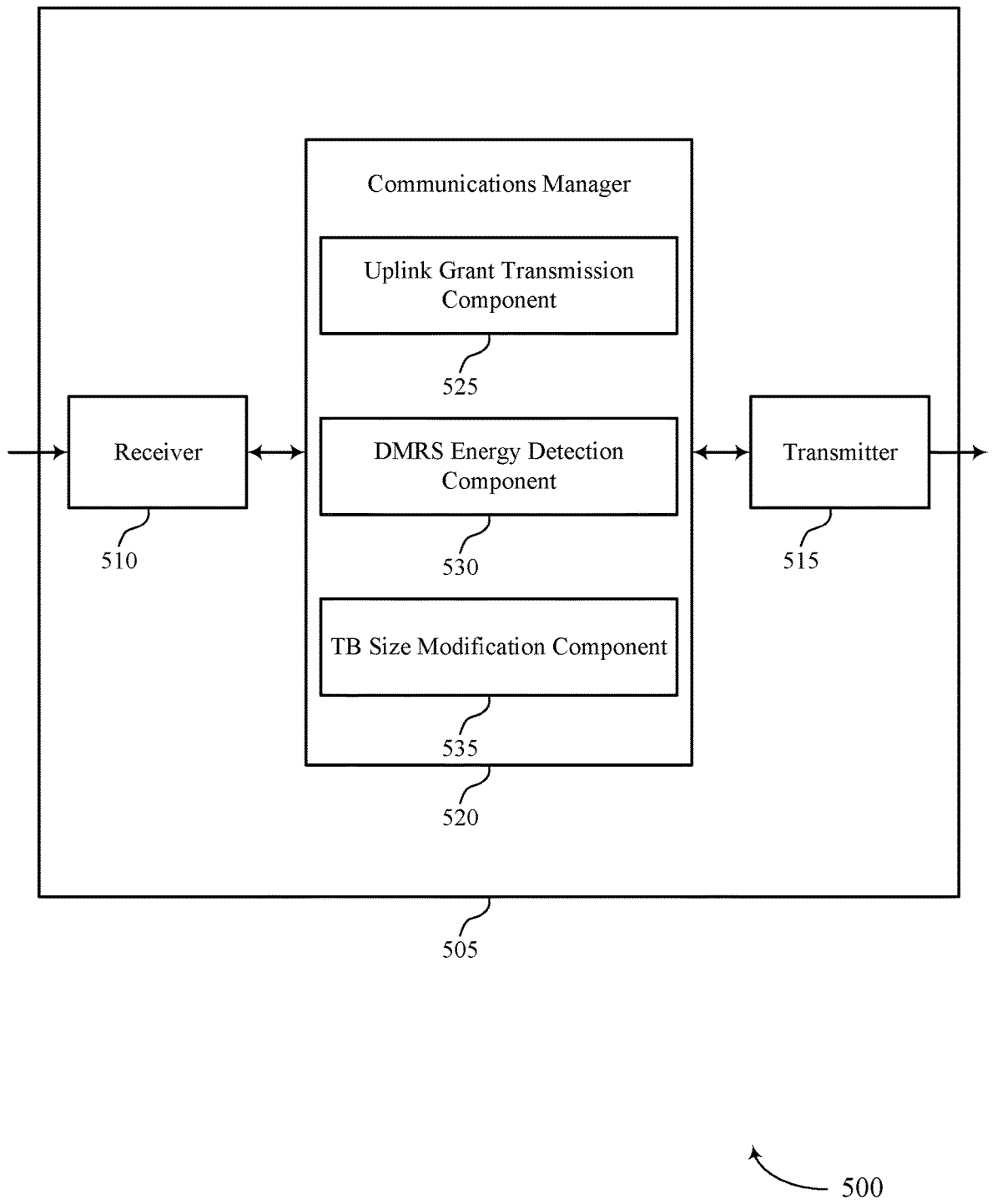

FIG. 5 shows a block diagram 500 of a device 505 that supports network solution for handling missed uplink grants in accordance with aspects of the present disclosure. The device 505 may be an example of aspects of a device 405 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to network solution for handling missed uplink grants). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to network solution for handling missed uplink grants). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of network solution for handling missed uplink grants as described herein. For example, the communications manager 520 may include an uplink grant transmission component 525, a DMRS energy detection component 530, a TB size modification component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a base station in accordance with examples as disclosed herein. The uplink grant transmission component 525 may be configured as or otherwise support a means for transmitting, to a UE, a first transport block including a first uplink grant scheduling a first set of one or more uplink shared channel transmissions for the UE. The DMRS energy detection component 530 may be configured as or otherwise support a means for detecting an energy value for a demodulation reference signal associated with the one or more uplink shared channel transmissions associated with the first uplink grant that is less than a threshold energy value. The TB size modification component 535 may be configured as or otherwise support a means for modifying a size of a second transport block relative to the first transport block, the second transport block including a second uplink grant scheduling a second set of one or more uplink shared channel transmissions for the UE based on the detected energy value being less than the threshold energy value. The uplink grant transmission component 525 may be configured as or otherwise support a means for transmitting the second transport block.

Figure 6:
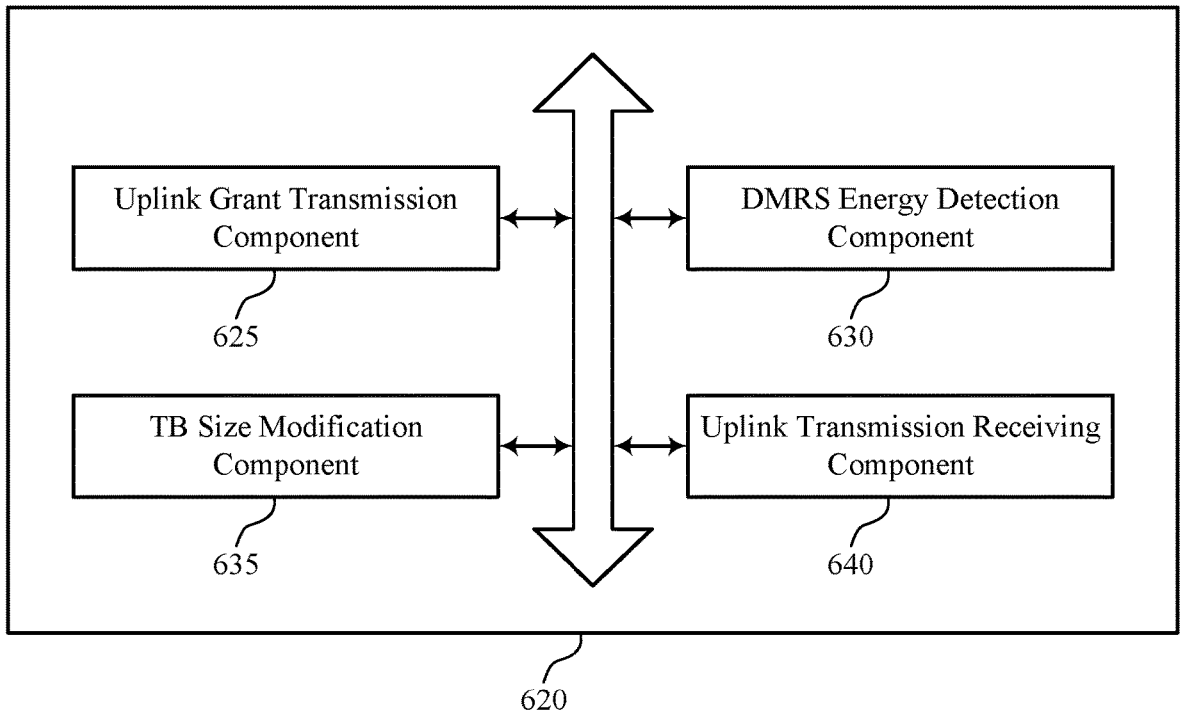
FIG. 6 shows a block diagram of a communications manager that supports network solution for handling missed uplink grants in accordance with aspects of the present disclosure.

FIG. 6 shows a block diagram 600 of a communications manager 620 that supports network solution for handling missed uplink grants in accordance with aspects of the present disclosure. The communications manager 620 may be an example of aspects of a communications manager 420, a communications manager 520, or both, as described herein. The communications manager 620, or various components thereof, may be an example of means for performing various aspects of network solution for handling missed uplink grants as described herein. For example, the communications manager 620 may include an uplink grant transmission component 625, a DMRS energy detection component 630, a TB size modification component 635, an uplink transmission receiving component 640, or any combination thereof. Each of these components may communicate, directly or indirectly, with one another (e.g., via one or more buses).

The communications manager 620 may support wireless communications at a base station in accordance with examples as disclosed herein. The uplink grant transmission component 625 may be configured as or otherwise support a means for transmitting, to a UE, a first transport block including a first uplink grant scheduling a first set of one or more uplink shared channel transmissions for the UE. The DMRS energy detection component 630 may be configured as or otherwise support a means for detecting an energy value for a demodulation reference signal associated with the one or more uplink shared channel transmissions associated with the first uplink grant that is less than a threshold energy value. The TB size modification component 635 may be configured as or otherwise support a means for modifying a size of a second transport block relative to the first transport block, the second transport block including a second uplink grant scheduling a second set of one or more uplink shared channel transmissions for the UE based on the detected energy value being less than the threshold energy value. In some examples, the uplink grant transmission component 625 may be configured as or otherwise support a means for transmitting the second transport block.

In some examples, to support modifying, the TB size modification component 635 may be configured as or otherwise support a means for modifying a modulation and coding scheme of the second transport block, a number of resource blocks of the second transport block, or both, based on the detected energy value being less than the threshold energy value.

In some examples, to support modifying, the TB size modification component 635 may be configured as or otherwise support a means for increasing or decreasing a size of the second transport block relative to the first transport block.

In some examples, the threshold energy value further includes a signal to noise ratio threshold value.

In some examples, to support detecting the energy value, the DMRS energy detection component 630 may be configured as or otherwise support a means for determining that the UE skipped transmission of the first set of one or more uplink shared channel transmissions scheduled by the first uplink grant based on the detected energy value being less than the threshold energy value.

In some examples, the uplink transmission receiving component 640 may be configured as or otherwise support a means for receiving the second set of one or more uplink shared channel transmissions in accordance with the second uplink grant.

In some examples, the second set of one or more uplink shared channel transmissions are different from the first set of one or more uplink shared channel transmissions.

In some examples, the first uplink grant decoded by the UE is associated with a first new data indicator and the second uplink grant decoded by the UE is associated with a second new data indicator, the second new data indicator being the same as the first new data indicator.

In some examples, the first uplink grant decoded by the UE is associated with a first HARQ identifier and the second uplink grant decoded by the UE is associated with a second HARQ identifier, the second HARQ identifier being the same as the first HARQ identifier.

In some examples, to support detecting the energy value, the DMRS energy detection component 630 may be configured as or otherwise support a means for detecting an energy value for each demodulation reference signal associated with each uplink shared channel transmission of the one or more uplink shared channel transmissions associated with the first uplink grant, where the energy value for each demodulation reference signal is less than the threshold energy value.

Figure 7:
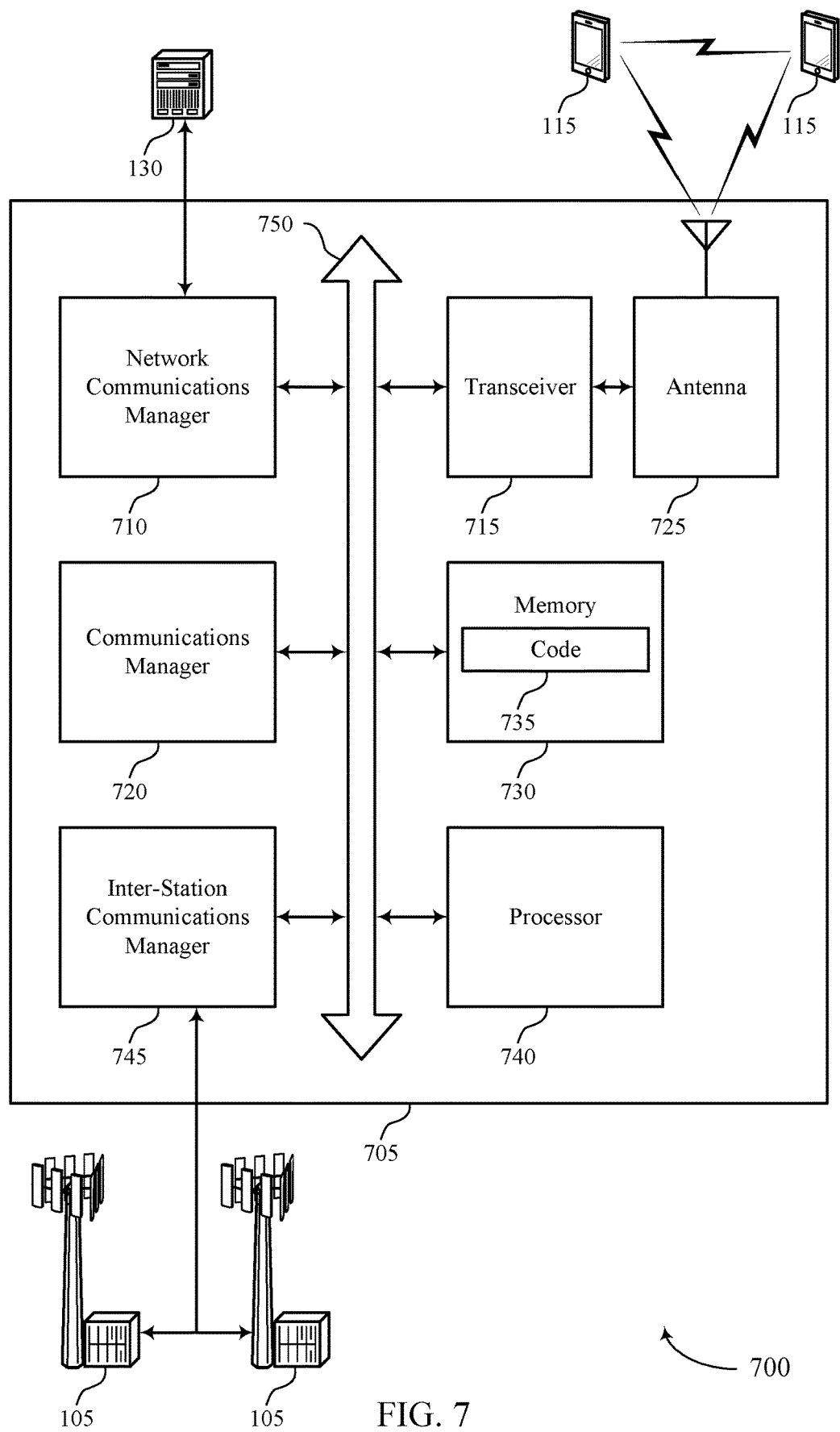
FIG. 7 shows a diagram of a system including a device that supports network solution for handling missed uplink grants in accordance with aspects of the present disclosure.

FIG. 7 shows a diagram of a system 700 including a device 705 that supports network solution for handling missed uplink grants in accordance with aspects of the present disclosure. The device 705 may be an example of or include the components of a device 405, a device 505, or a base station 105 as described herein. The device 705 may communicate wirelessly with one or more base stations 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting network solution for handling missed uplink grants). For example, the device 705 or a component of the device 705 may include a processor 740 and memory 730 coupled with or to the processor 740, the processor 740 and memory 730 configured to perform various functions described herein.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

The communications manager 720 may support wireless communications at a base station in accordance with examples as disclosed herein. For example, the communications manager 720 may be configured as or otherwise support a means for transmitting, to a UE, a first transport block including a first uplink grant scheduling a first set of one or more uplink shared channel transmissions for the UE. The communications manager 720 may be configured as or otherwise support a means for detecting an energy value for a demodulation reference signal associated with the one or more uplink shared channel transmissions associated with the first uplink grant that is less than a threshold energy value. The communications manager 720 may be configured as or otherwise support a means for modifying a size of a second transport block relative to the first transport block, the second transport block including a second uplink grant scheduling a second set of one or more uplink shared channel transmissions for the UE based on the detected energy value being less than the threshold energy value. The communications manager 720 may be configured as or otherwise support a means for transmitting the second transport block.

By including or configuring the communications manager 720 in accordance with examples as described herein, the device 705 may support techniques for improved communication reliability, reduced latency, more efficient utilization of communication resources including increased uplink scheduling efficiency, improved coordination between devices, and higher uplink throughput.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of network solution for handling missed uplink grants as described herein, or the processor 740 and the memory 730 may be otherwise configured to perform or support such operations.

Figure 8:
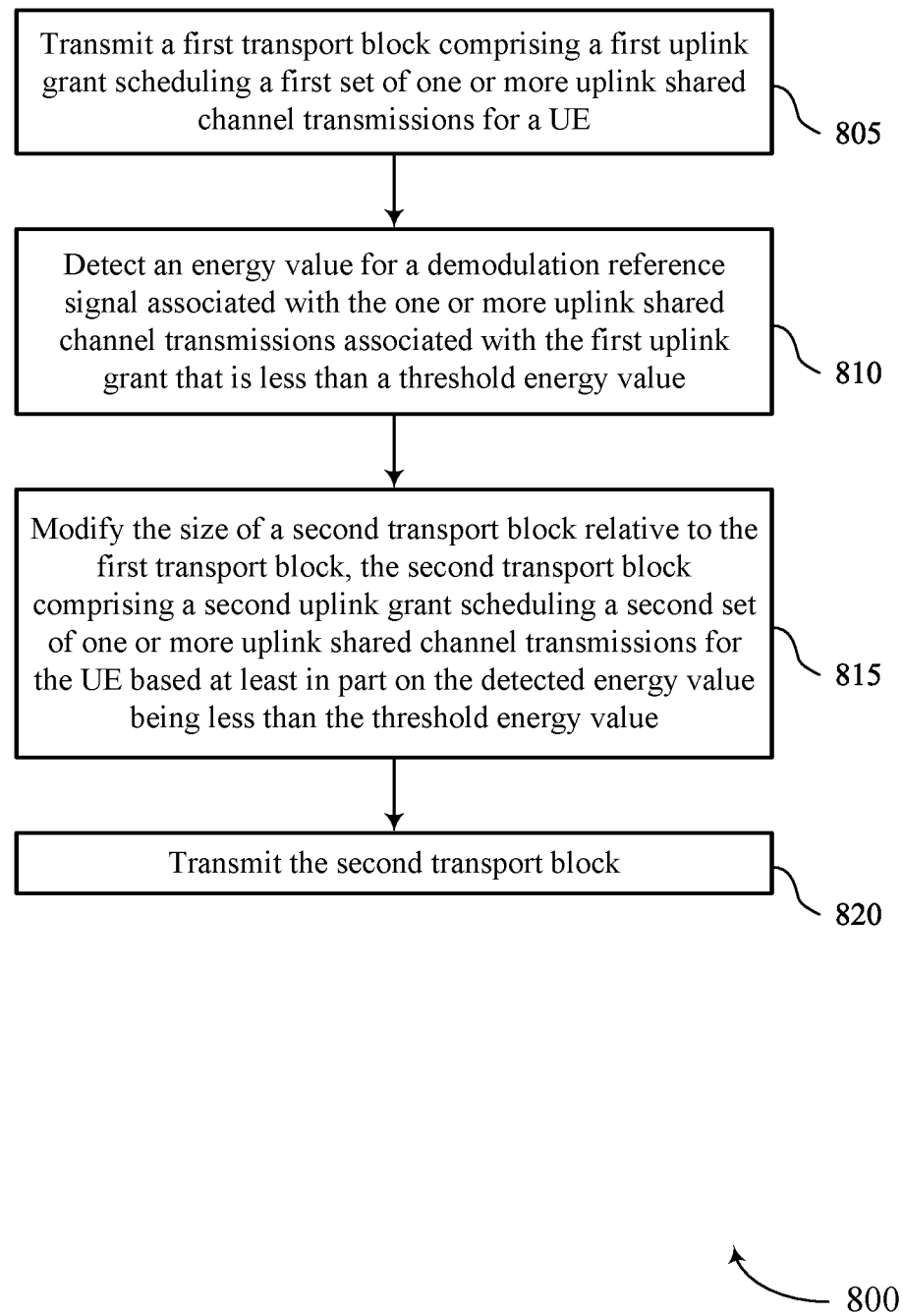
FIGS. 8 and 9 show flowcharts illustrating methods that support network solution for handling missed uplink grants in accordance with aspects of the present disclosure.

FIG. 8 shows a flowchart illustrating a method 800 that supports network solution for handling missed uplink grants in accordance with aspects of the present disclosure. The operations of the method 800 may be implemented by a base station or its components as described herein. For example, the operations of the method 800 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 805, the method may include transmitting, to a UE, a first transport block including a first uplink grant scheduling a first set of one or more uplink shared channel transmissions for the UE. The operations of 805 may be performed in accordance with examples as disclosed herein. In some examples, aspects of the operations of 805 may be performed by an uplink grant transmission component 625 as described with reference to FIG. 6.

At 810, the method may include detecting an energy value for a demodulation reference signal associated with the one or more uplink shared channel transmissions associated with the first uplink grant that is less than a threshold energy value. The operations of 810 may be performed in accordance with examples as disclosed herein. In some examples, aspects of the operations of 810 may be performed by a DMRS energy detection component 630 as described with reference to FIG. 6.

At 815, the method may include modifying a size of a second transport block relative to the first transport block, the second transport block including a second uplink grant scheduling a second set of one or more uplink shared channel transmissions for the UE based on the detected energy value being less than the threshold energy value. The operations of 815 may be performed in accordance with examples as disclosed herein. In some examples, aspects of the operations of 815 may be performed by a TB size modification component 635 as described with reference to FIG. 6.

At 820, the method may include transmitting the second transport block. The operations of 820 may be performed in accordance with examples as disclosed herein. In some examples, aspects of the operations of 820 may be performed by an uplink grant transmission component 625 as described with reference to FIG. 6.

Figure 9:
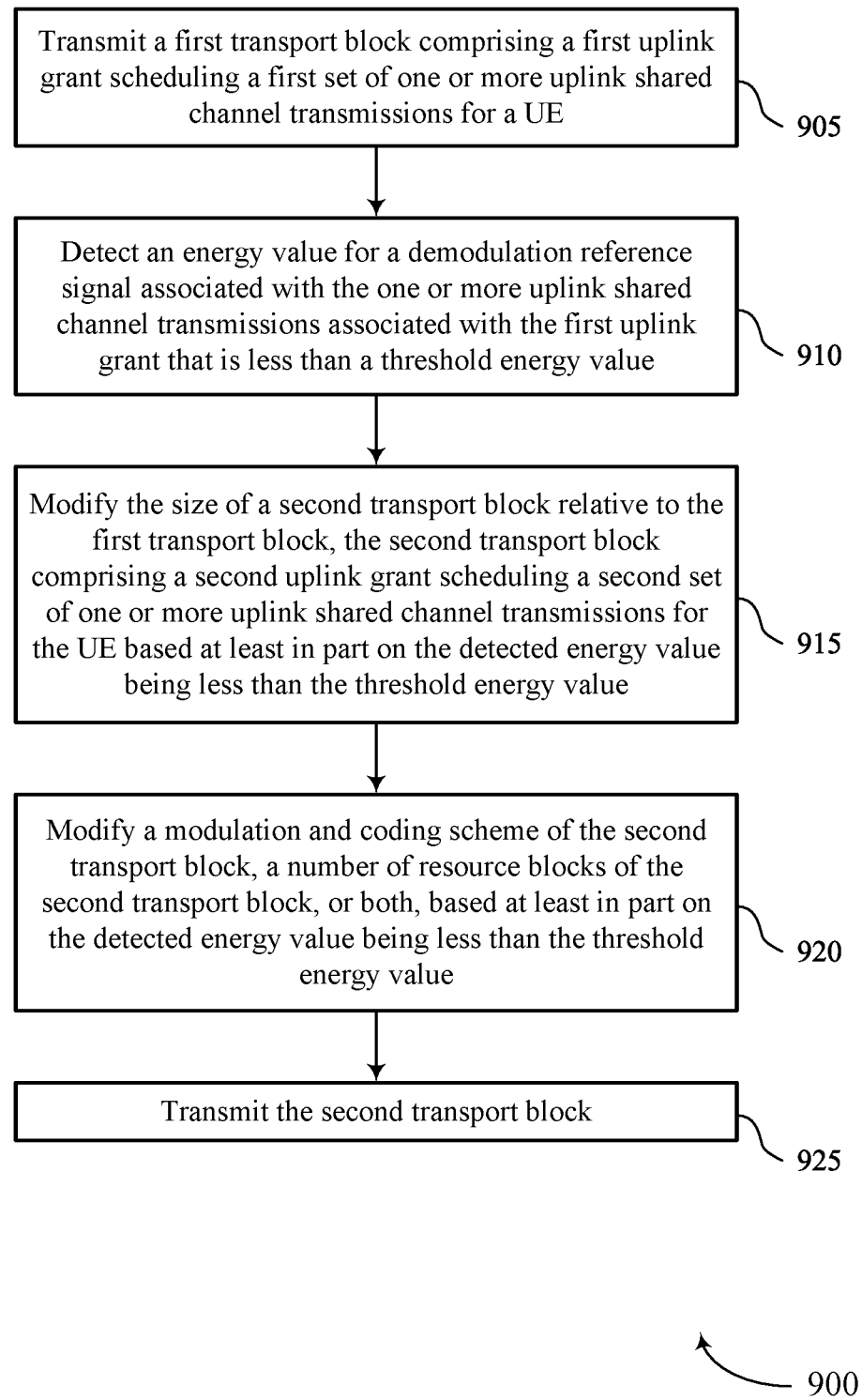

FIG. 9 shows a flowchart illustrating a method 900 that supports network solution for handling missed uplink grants in accordance with aspects of the present disclosure. The operations of the method 900 may be implemented by a base station or its components as described herein. For example, the operations of the method 900 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 905, the method may include transmitting, to a UE, a first transport block including a first uplink grant scheduling a first set of one or more uplink shared channel transmissions for the UE. The operations of 905 may be performed in accordance with examples as disclosed herein. In some examples, aspects of the operations of 905 may be performed by an uplink grant transmission component 625 as described with reference to FIG. 6.

At 910, the method may include detecting an energy value for a demodulation reference signal associated with the one or more uplink shared channel transmissions associated with the first uplink grant that is less than a threshold energy value. The operations of 910 may be performed in accordance with examples as disclosed herein. In some examples, aspects of the operations of 910 may be performed by a DMRS energy detection component 630 as described with reference to FIG. 6.

At 915, the method may include modifying a size of a second transport block relative to the first transport block, the second transport block including a second uplink grant scheduling a second set of one or more uplink shared channel transmissions for the UE based on the detected energy value being less than the threshold energy value. The operations of 915 may be performed in accordance with examples as disclosed herein. In some examples, aspects of the operations of 915 may be performed by a TB size modification component 635 as described with reference to FIG. 6.

At 920, the method may include modifying a modulation and coding scheme of the second transport block, a number of resource blocks of the second transport block, or both, based on the detected energy value being less than the threshold energy value. The operations of 920 may be performed in accordance with examples as disclosed herein. In some examples, aspects of the operations of 920 may be performed by a TB size modification component 635 as described with reference to FIG. 6.

At 925, the method may include transmitting the second transport block. The operations of 925 may be performed in accordance with examples as disclosed herein. In some examples, aspects of the operations of 925 may be performed by an uplink grant transmission component 625 as described with reference to FIG. 6.

The following provides an overview of aspects of the present disclosure:

Aspect 1: A method for wireless communications at a base station, comprising: transmitting, to a UE, a first transport block comprising a first uplink grant scheduling a first set of one or more uplink shared channel transmissions for the UE; detecting an energy value for a DMRS associated with the one or more uplink shared channel transmissions associated with the first uplink grant that is less than a threshold energy value; and modifying the size of a second transport block relative to the first transport block, the second transport block comprising a second uplink grant scheduling a second set of one or more uplink shared channel transmissions for the UE based at least in part on the detected energy value being less than the threshold energy value; and transmitting, to the UE, a second transport block.

Aspect 2: The method of aspect 1, wherein the modifying further comprises: modifying a MCS of the second transport block, a number of resource blocks of the second transport block, or both, based at least in part on the detected energy value being less than the threshold energy value.

Aspect 3: The method of any of aspects 1 through 2, wherein the modifying further comprises: increasing or decreasing the size of the second transport block relative to the first transport block.

Aspect 4: The method of any of aspects 1 through 3, wherein the threshold energy value further comprises a SNR threshold value.

Aspect 5: The method of any of aspects 1 through 4, wherein detecting the energy value further comprises: determining that the UE skipped transmission of the first set of one or more uplink shared channel transmissions scheduled by the first uplink grant based at least in part on the detected energy value being less than the threshold energy value.

Aspect 6: The method of any of aspects 1 through 5, further comprising: receiving, from the UE, the second set of one or more uplink shared channel transmissions in accordance with the second uplink grant.

Aspect 7: The method of aspect 6, wherein the second set of one or more uplink shared channel transmissions are different from the first set of one or more uplink shared channel transmissions.

Aspect 8: The method of any of aspects 1 through 7, wherein the first uplink grant decoded by the UE is associated with a first NDI and the second uplink grant decoded by the UE is associated with a second NDI, the second NDI being the same as the first NDI.

Aspect 9: The method of any of aspects 1 through 8, wherein the first uplink grant decoded by the UE is associated with a first HARQ identifier and the second uplink grant decoded by the UE is associated with a second HARQ identifier, the second HARQ identifier being the same as the first HARQ identifier.

Aspect 10: The method of any of aspects 1 through 9, wherein detecting the energy value further comprises: detecting an energy value for each DMRS associated with each uplink shared channel transmission of the one or more uplink shared channel transmissions associated with the first uplink grant, wherein the energy value for each DMRS is less than the threshold energy value.

Aspect 11: An apparatus for wireless communications at a base station, comprising a processor; memory coupled with the processor; and instructions stored in the memory and executable by the processor to cause the apparatus to perform a method of any of aspects 1 through 10.

Aspect 12: An apparatus for wireless communications at a base station, comprising at least one means for performing a method of any of aspects 1 through 10.

Aspect 13: A non-transitory computer-readable medium storing code for wireless communications at a base station, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a network device, comprising:
    one or more processors;
    one or more memories coupled with the one or more processors; and
    instructions stored in the one or more memories and executable by the one or more processors to cause the apparatus to:

transmit, to a user equipment (UE), a first transport block comprising a first uplink grant scheduling a first set of one or more uplink shared channel transmissions for the UE;

detect an energy value for a demodulation reference signal associated with the first set of one or more uplink shared channel transmissions associated with the first uplink grant that is less than a threshold energy value, wherein the energy value being less than the threshold energy value indicates the UE missed the first uplink grant;

modify a size of a second transport block to be different from a respective size of the first transport block, the second transport block comprising a second uplink grant scheduling a second set of one or more uplink shared channel transmissions for the UE based at least in part on the detected energy value being less than the threshold energy value; and transmit the second transport block to the UE based at least in part on modifying the size of the second transport block.

2. The apparatus of claim 1, wherein the instructions to modify the size of the second transport block are further executable by the one or more processors to cause the apparatus to:

modify a modulation and coding scheme of the second transport block, a number of resource blocks of the second transport block, or both, based at least in part on the detected energy value being less than the threshold energy value.

3. The apparatus of claim 1, wherein the instructions to modify the size of the second transport block are further executable by the one or more processors to cause the apparatus to:

increase or decrease the size of the second transport block relative to the first transport block.

4. The apparatus of claim 1, wherein the threshold energy value comprises a signal to noise ratio threshold value.

5. The apparatus of claim 1, wherein the instructions to detect the energy value are further executable by the one or more processors to cause the apparatus to:

determine that the UE skipped a transmission of the first set of one or more uplink shared channel transmissions scheduled by the first uplink grant based at least in part on the detected energy value being less than the threshold energy value.

6. The apparatus of claim 1, wherein the instructions are further executable by the one or more processors to cause the apparatus to:

receive the second set of one or more uplink shared channel transmissions in accordance with the second uplink grant.

7. The apparatus of claim 6, wherein the second set of one or more uplink shared channel transmissions are different from the first set of one or more uplink shared channel transmissions.

8. The apparatus of claim 1, wherein the first uplink grant decoded by the UE is associated with a first new data indicator and the second uplink grant decoded by the UE is associated with a second new data indicator, the second new data indicator being the same as the first new data indicator.

9. The apparatus of claim 1, wherein the first uplink grant decoded by the UE is associated with a first hybrid automatic repeat request (HARQ) identifier and the second uplink grant decoded by the UE is associated with a second HARQ identifier, the second HARQ identifier being the same as the first HARQ identifier.

10. The apparatus of claim 1, wherein the instructions to detect the energy value are further executable by the one or more processors to cause the apparatus to:

detect energy values for each demodulation reference signal associated with each uplink shared channel transmission of the first set of one or more uplink shared channel transmissions associated with the first uplink grant, wherein the energy value for each demodulation reference signal is less than the threshold energy value.

11. A method for wireless communications at a network device, comprising:

transmitting, to a user equipment (UE), a first transport block comprising a first uplink grant scheduling a first set of one or more uplink shared channel transmissions for the UE;

detecting an energy value for a demodulation reference signal associated with the first set of one or more uplink shared channel transmissions associated with the first uplink grant that is less than a threshold energy value, wherein the energy value being less than the threshold energy value indicates the UE missed the first uplink grant;

modifying a size of a second transport block to be different from a respective size of the first transport block, the second transport block comprising a second uplink grant scheduling a second set of one or more uplink shared channel transmissions for the UE based at least in part on the detected energy value being less than the threshold energy value; and transmitting the second transport block to the UE based at least in part on modifying the size of the second transport block.

12. The method of claim 11, wherein modifying the size of the second transport block comprises:

modifying a modulation and coding scheme of the second transport block, a number of resource blocks of the second transport block, or both, based at least in part on the detected energy value being less than the threshold energy value.

13. The method of claim 11, wherein modifying the size of the second transport block comprises:

increasing or decreasing the size of the second transport block relative to the first transport block.

14. The method of claim 11, wherein the threshold energy value comprises a signal to noise ratio threshold value.

15. The method of claim 11, wherein detecting the energy value comprises:

determining that the UE skipped a transmission of the first set of one or more uplink shared channel transmissions scheduled by the first uplink grant based at least in part on the detected energy value being less than the threshold energy value.

16. The method of claim 11, further comprising:

receiving the second set of one or more uplink shared channel transmissions in accordance with the second uplink grant.

17. The method of claim 16, wherein the second set of one or more uplink shared channel transmissions are different from the first set of one or more uplink shared channel transmissions.

18. The method of claim 11, wherein the first uplink grant decoded by the UE is associated with a first new data indicator and the second uplink grant decoded by the UE is associated with a second new data indicator, the second new data indicator being the same as the first new data indicator.

19. The method of claim 11, wherein the first uplink grant decoded by the UE is associated with a first hybrid automatic repeat request (HARQ) identifier and the second uplink grant decoded by the UE is associated with a second HARQ identifier, the second HARQ identifier being the same as the first HARQ identifier.

20. The method of claim 11, wherein detecting the energy value comprises:
detecting energy values for each demodulation reference signal associated with each uplink shared channel transmission of the first set of one or more uplink shared channel transmissions associated with the first uplink grant, wherein the energy value for each demodulation reference signal is less than the threshold energy value.

21. An apparatus for wireless communications at a network device, comprising:
means for transmitting, to a user equipment (UE), a first transport block comprising a first uplink grant scheduling a first set of one or more uplink shared channel transmissions for the UE;
means for detecting an energy value for a demodulation reference signal associated with the first set of one or more uplink shared channel transmissions associated with the first uplink grant that is less than a threshold energy value, wherein the energy value being less than the threshold energy value indicates the UE missed the first uplink grant;
means for modifying a size of a second transport block to be different from a respective size of the first transport block, the second transport block comprising a second uplink grant scheduling a second set of one or more uplink shared channel transmissions for the UE based at least in part on the detected energy value being less than the threshold energy value; and
means for transmitting the second transport block to the UE based at least in part on modifying the size of the second transport block.

22. The apparatus of claim 21, wherein the means for modifying the size of the second transport block comprise:
means for modifying a modulation and coding scheme of the second transport block, a number of resource blocks of the second transport block, or both, based at least in part on the detected energy value being less than the threshold energy value.

23. The apparatus of claim 21, wherein the means for modifying the size of the second transport block comprise:
means for increasing or decreasing the size of the second transport block relative to the first transport block.

24. The apparatus of claim 21, wherein the threshold energy value comprises a signal to noise ratio threshold value.

25. The apparatus of claim 21, wherein the means for detecting the energy value comprise:
means for determining that the UE skipped a transmission of the first set of one or more uplink shared channel transmissions scheduled by the first uplink grant based at least in part on the detected energy value being less than the threshold energy value.

26. The apparatus of claim 21, further comprising:
means for receiving the second set of one or more uplink shared channel transmissions in accordance with the second uplink grant.

27. The apparatus of claim 26, wherein the second set of one or more uplink shared channel transmissions are different from the first set of one or more uplink shared channel transmissions.

28. The apparatus of claim 21, wherein the first uplink grant decoded by the UE is associated with a first new data indicator and the second uplink grant decoded by the UE is associated with a second new data indicator, the second new data indicator being the same as the first new data indicator.

29. The apparatus of claim 21, wherein the first uplink grant decoded by the UE is associated with a first hybrid automatic repeat request (HARQ) identifier and the second uplink grant decoded by the UE is associated with a second HARQ identifier, the second HARQ identifier being the same as the first HARQ identifier.

30. A non-transitory computer-readable medium storing code for wireless communications at a network device, the code comprising instructions executable by one or more processors to:
transmit, to a user equipment (UE), a first transport block comprising a first uplink grant scheduling a first set of one or more uplink shared channel transmissions for the UE;
detect an energy value for a demodulation reference signal associated with the first set of one or more uplink shared channel transmissions associated with the first uplink grant that is less than a threshold energy value, wherein the energy value being less than the threshold energy value indicates the UE missed the first uplink grant;
modify a size of a second transport block to be different from a respective size of the first transport block, the second transport block comprising a second uplink grant scheduling a second set of one or more uplink shared channel transmissions for the UE based at least in part on the detected energy value being less than the threshold energy value; and
transmit the second transport block to the UE based at least in part on modifying the size of the second transport block.

* * * * *